N. H. HASSEL.
RESILIENT TIRE.
APPLICATION FILED JULY 6, 1909.
973,781.
Patented Oct. 25, 1910.
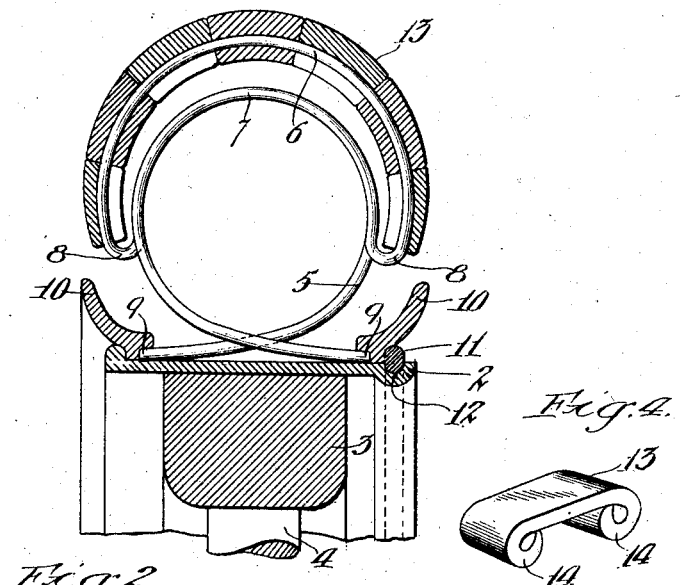
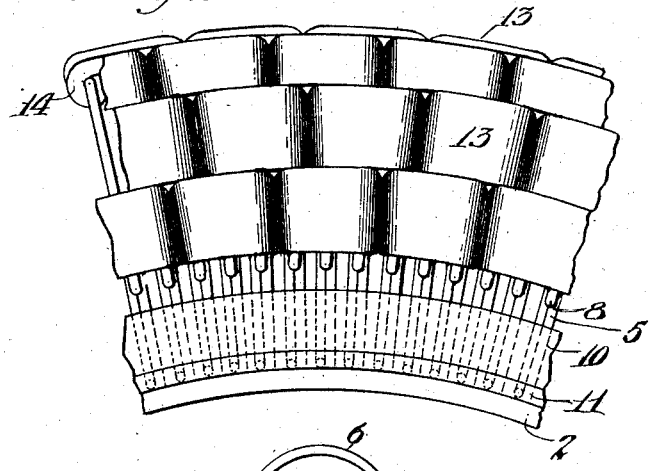
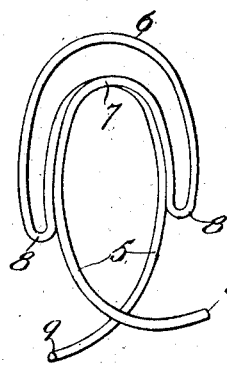
Witnesses:
Louis W. Gratz.
Geo. J. Huting.
Inventor
Nels H. Hassel
by
attys

UNITED STATES PATENT OFFICE.

NELS H. HASSEL, OF LOS ANGELES, CALIFORNIA.

RESILIENT TIRE.

973,781.  Specification of Letters Patent.  Patented Oct. 25, 1910.

Application filed July 6, 1909. Serial No. 506,232.

*To all whom it may concern:*

Be it known that I, NELS H. HASSEL, a citizen of the United States, residing at Los Angeles, in the county of Los Angeles and State of California, have invented a new and useful Improvement in Resilient Tires, of which the following is a specification.

My invention relates to that class of resilient tires which are constructed from units or members formed from resilient material, such as wire, arranged side by side, and one of the objects of this invention is to provide a tire in which the units or members are duplicates thereby producing a tire which is simple and cheap in construction.

Another object of this invention is to provide means for connecting the outer portion of the resilient members so as to provide for the greatest amount of flexibility and at the same time provide a tread portion, formed by the connecting means, of great wearing quality.

A further object of this invention is to provide a tire of the class described which may be readily fitted to the standard pneumatic tire rim without the necessity of changing the construction of the rim.

Referring to the drawings:—Figure 1 is a cross sectional view of a portion of a wheel equipped with my invention. Fig. 2 is a side elevation of the same. Fig. 3 is a perspective view of one of the resilient members. Fig. 4 is a perspective view of one of the connecting means.

2 designates the rim of a wheel preferably formed of metal.

3 designates the felly and 4 one of the spokes of the wheel.

Transversely seated upon the rim 2 and arranged side by side are the resilient members 5, each member being formed of tempered steel wire or other resilient material. The resilient member 5 comprises a floating arch 6, spring supported by means of an inner arch 7 formed by the ends of the wire being curved upwardly from the base 8 of the floating arch 6 and lying side by side until they reach a point opposite the base 8 of the floating arch where they turn inwardly and downwardly crossing each other at a central point beneath the arches 6 and 7. The ends 9 of the wire terminate at points approximately under the base 8 of the floating arch 6 and rest upon the rim 2 where they are securely held between retaining rings 10 by means of a clamping ring 11 which fits into a groove 12 in the rim 2.

The tread portion of the tire is formed of plates 13 arranged circumferentially in rows, the outer surface of the plates 13, in cross section conforming to an arc of a circle approximately of the same radius as the floating arch 6. Each plate spans three of the members 5, the ends 14 of each plate being bent around the arch 6 of a member 5. The plates 13 of the successive rows are in staggered relation to each other and are so arranged that the ends of the plates in the successive rows engage alternate members 5 in such a manner that the floating arch 6 of each member 5 is engaged and held firmly in place by the plates 13. The plates 13 are preferably formed of metal but any material may be used which has proper wearing quality and ductility.

In the form shown I have used seven rows of plates, but it should be understood that the plates may be made of less or greater width which would correspondingly vary the number of rows of plates used, the plates 13 in the central part of the tread portion of the tire being made of greater thickness than those of the adjacent rows. The plates of the successive rows on each side of the central row diminish in thickness, it not being necessary to have them as thick, the greatest wear being upon the central rows of plates. The retaining rings 10 are flanged outwardly so that when the tire is under compression the rows of plates 13 at the base of the arch 6 are permitted to rest against the inner face of the retaining rings.

The tread portion of the tire composed of the plates pivotally connected to the outer or floating arch of the spring members provides a construction that has the necessary continuity required but which permits sufficient movement of the individual plates to provide elasticity. The inner arch of the spring members, comprising two spring wires side by side, is less rigid than the outer floating arch, and forms, together with the ends of the wires resting upon the rim of the wheel, an elastic support for the tread portion of the tire.

What I claim is:—

1. In a tire, a plurality of spring members formed of wire and arranged side by side, said spring members having an outer arch, the base of said outer arch supported by an inner arch, said inner arch formed by two thicknesses of wire side by side, the ends of said wire projecting downwardly and crossing each other at a central point under said arches, means for securing the ends of said wire to a rim, and a plurality of plates supported by said outer arch.

2. In a tire, a plurality of radial spring members transversely disposed, each of said spring members having an outer arch with the ends thereof bent inwardly side by side to the opposite side of said outer arch forming a double inner arch, a plurality of rows of blocks encircling the outer arch of said spring members and means for attaching said spring members to a rim.

In testimony whereof, I have hereunto set my hand at Los Angeles, California, this 1st day of July 1909.

NELS H. HASSEL.

In presence of—
FRANK L. A. GRAHAM,
P. H. SHELTON.